US011287259B2

(12) United States Patent
Vissiere et al.

(10) Patent No.: US 11,287,259 B2
(45) Date of Patent: Mar. 29, 2022

(54) DETERMINATION OF HEADING FROM THE FIELD MEASURED BY MAGNETIC SENSORS

(71) Applicant: SYSNAV, Vernon (FR)

(72) Inventors: David Vissiere, Paris (FR);
Charles-Ivan Chesneau, Paris (FR);
Mathieu Hillion, Vernon (FR);
Christophe Prieur, Eybens (FR)

(73) Assignee: SYSNAV, Vernon (FR)

( * ) Notice: Subject to any disclaimer, the term of this patent is extended or adjusted under 35 U.S.C. 154(b) by 0 days.

(21) Appl. No.: 16/634,426

(22) PCT Filed: Jul. 27, 2018

(86) PCT No.: PCT/FR2018/051941
§ 371 (c)(1),
(2) Date: Jan. 27, 2020

(87) PCT Pub. No.: WO2019/020962
PCT Pub. Date: Jan. 31, 2019

(65) Prior Publication Data
US 2020/0158505 A1 May 21, 2020

(30) Foreign Application Priority Data
Jul. 28, 2017 (FR) ...................................... 1757223

(51) Int. Cl.
*G01C 17/28* (2006.01)
*G01C 17/38* (2006.01)
(Continued)

(52) U.S. Cl.
CPC ............. *G01C 17/28* (2013.01); *G01C 17/38* (2013.01); *G01C 21/165* (2013.01); *G01C 21/206* (2013.01)

(58) Field of Classification Search
CPC ...... G01C 17/28; G01C 17/38; G01C 21/165; G01C 21/206
See application file for complete search history.

(56) References Cited

U.S. PATENT DOCUMENTS 9,506,755 B2 * 11/2016 Tu .......................... G01C 17/38
10,809,317 B2 * 10/2020 Bhattacharyya ... G01R 33/0017
(Continued)

FOREIGN PATENT DOCUMENTS

EP 2264485 A1 12/2010

OTHER PUBLICATIONS

Afzal et al., "Assessment of Indoor Magnetic Field Anomalies using Multiple Magnetometers", Proceedings of the 23rd International Technical Meeting of The Satellite Division of the Institute of Navigation (ION GNSS 2010), Sep. 21-24, 2010, pp. 1-9.
(Continued)

*Primary Examiner* — Mischita L Henson
(74) *Attorney, Agent, or Firm* — Womble Bond Dickinson (US) LLP

(57) ABSTRACT

A method for the determination of heading by magnetic sensors, in which a magnetic field is measured by magnetometers and using recursive processing calculating for a given sampling time. An estimation of a heading prediction which is a function of the heading is determined at the preceding sampling time. A resetting of the predicted heading is then estimated as a function of a magnetic heading determined from magnetometer measurements. During the resetting, the calculating estimates the amplitude of the resetting as a function of a model of the change in magnetic disturbances between two sampling times, and of an a priori estimation of the amplitude of the disturbances.

14 Claims, 3 Drawing Sheets

(51) Int. Cl.
*G01C 21/16* (2006.01)
*G01C 21/20* (2006.01)

(56) References Cited

U.S. PATENT DOCUMENTS

| | | | |
|---|---|---|---|
| 2010/0114517 A1 | 5/2010 | Boeve et al. | |
| 2014/0122015 A1 | 5/2014 | Handa | |
| 2014/0297212 A1* | 10/2014 | Anderson | G01C 25/005 |
| | | | 702/90 |
| 2017/0261320 A1* | 9/2017 | Tornqvist | G01C 17/28 |
| 2017/0307404 A1* | 10/2017 | Funk | G01C 25/00 |

OTHER PUBLICATIONS

Afzal et al., "Magnetic field based heading estimation for pedestrian navigation environments", 2011 International Conference on Indoor Positioning and Indoor Navigation, Sep. 2011, 10 pages.

Crassidis et al., "Unscented Filtering for Spacecraft Attitude Estimation", Journal of Guidance, Control, and Dynamics, vol. 26. No. 4, Jul. 2003, pp. 1-34.

Faulkner et al., "Gps-denied pedestrian tracking in indoor environments using an imu and magnetic compass", Proceedings of the 2010 International Technical Meeting of The Institute of Navigation, Jan. 2010, 7 pages.

International Preliminary Report on Patentability received for PCT Patent Application No. PCT/FR2018/051941, dated Feb. 6, 2020, 16 pages (8 pages of English Translation and 8 pages of Original Document).

International Search Report and Written Opinion received for PCT Patent Application No. PCT/FR2018/051941, dated Nov. 27, 2018, 20 pages (9 pages of English Translation and 11 pages of Original Document).

Preliminary Research Report received for French Application No. 1757223, dated Apr. 4, 2018, 4 pages (1 page of French Translation Cover Sheet and 3 pages of original document).

Romanovas et al., "A Study on Indoor Pedestrian Localization Algorithms with Foot-Mounted Sensors", 2012 International Conference on Indoor Positioning and Indoor Navigation, IEEE, Nov. 13-15, 2012, pp. 1-10.

\* cited by examiner

DETERMINATION OF HEADING FROM THE FIELD MEASURED BY MAGNETIC SENSORS

GENERAL TECHNICAL FIELD AND PRIOR ART

The present invention relates, generally speaking, to magneto-inertial techniques.

More precisely, it relates to the determination of heading by magnetometers.

In particular, it advantageously finds application in the case of measurements in urban areas or "indoors", that is to say inside buildings.

Conventionally, magnetometers are used for the calculation of heading in embedded systems.

In this case, the hypothesis is made that the magnetic field measured by the sensor is the Earth's magnetic field which points, for its horizontal component, to magnetic north. The difference between the direction of magnetic north and geographic north (called magnetic declination) is known and tabulated. Without loss of generality, hereafter it will thus be considered that magnetic north and geographic north are merged, and that the magnetometers thus indicate what will be called north.

Typically, determination methods used for the calculation of heading from magnetometer measurements are based on:
a modelling which links the measurement supplied by the magnetometer and information relative to the heading of the system,
a characterisation of the relevance of this relationship for the measurements made.

In a conventional approach, the calculation implemented may be a Kalman type filtering with the magnetic field as measurement, making it possible to reset the heading that is contained in the state, with a measurement noise that is a function of the characterisation of the relevance.

The modelling consists in writing that the measured magnetic field M contains a heading information, for example by the equation $$M = R(\psi, \theta, \varphi)^T M_{EARTH}$$

where R is the rotation matrix making it possible to go from the reference frame of the object to the Earth's inertial reference frame. $\psi$, $\theta$, $\varphi$ the Euler angles and $M_{EARTH}$ the Earth's magnetic field.

The relevance of this equation is characterised by a measurement variance, that is to say that it is assumed that the error in this equality is a random Gaussian variable with zero expectation.

This variance serves to calculate automatically the Kalman gain which weights the resetting to take account of different noises (dynamic noises linked to the external environment and magnetometer measurement noises).

In yet another approach, a calculation by linear filtering is implemented using the same type of modelling and characterisation.

In this approach, it is the relative adjustment of the amplitude of the gain of the equation that characterises the relevance thereof. In general, this gain is adjusted by hand. Those skilled in the art will then know how to weight it as a function of the relevance of the modelling.

Thus, in these two approaches, the parameters characterising the relevance of the model (variance in the Gaussian noise in the case of the Kalman filter, gain in the case of linear filtering) are generally constant parameters, independent of the measured magnetic field.

Characterisations of the relevance of the modelling taking into account the measured magnetic field while comparing it to a geomagnetic model of the Earth's magnetic field has recently been proposed, for example in the publications:

W. T. Faulkner, R. Alwood, W. T. David, and J. Bohlin, "Gps-denied pedestrian tracking in indoor environments using an imu and magnetic compass," in *Proceedings of the* 2010 *International Technical Meeting of The Institute of Navigation*, (San Diego, Calif.), pp. 198-204, January 2010, M. H. Afzal, V. Renaudin, and G. Lachapelle, "Magnetic field based heading estimation for pedestrian navigation environments," in 2011 *International Conference on Indoor Positioning and Indoor Navigation*, (Guimaraes, Portugal), September 2011, The characterisations thereby carried out do not however give entire satisfaction, firstly because they are based on an a priori model of the magnetic field, which necessitates having a model at least as precise as the desired precision and next, because they do not make it possible to reject all the disturbances.

The document "Unscented Filtering for Spacecraft Attitude Estimation" (J. L. Crassidis and F. Landis Markley) describes a model for estimating the orientation of a spacecraft. This model is based on the application of a Kalman filter and does not take any correlation into account. However this model also has for its part biases that make it not very reliable.

It is also known from the document EP 2 264 485 to propose a simplified model, in which the estimated magnetic field is equal to the sum of the value of the measured magnetic field, plus the value of the magnetic disturbance, plus the value of the measurement noise. However, this model of change in disturbance only takes account of a temporal relationship of the disturbance, which makes it not very reliable.

GENERAL DESCRIPTION OF THE INVENTION

A general aim of the invention is to propose a solution enabling better characterisation of the relevance of the modelling used, notably in highly disturbed environments.

Notably, the invention proposes a method for determining heading by magnetic sensors, in which a magnetic field is measured by magnetometers and calculation means implement a recursive processing calculating for a given sampling time:
an estimation of a heading prediction which is a function of the heading determined at the preceding sampling time,
a resetting of the predicted heading thereby estimated as a function of a magnetic heading determined from magnetometer measurements.

In a preferential embodiment during said resetting, the calculation means estimate the amplitude of the resetting as a function:
of a model of the change in magnetic disturbances between two sampling times,
and
of an a priori estimation of the amplitude of the disturbances.

In this way, the processing takes into account the change in the magnetic heading disturbance between two sampling times and takes account of the potential spatial correlation of the disturbance due to the environment in the case of successive sampling times.

The resetting that results therefrom is more reliable than in the prior art.

Said resetting is advantageously a function of the gradient of the measured magnetic field. In this way, one takes into account the fact that the more the environment is disturbed, the higher the gradient and thus the more the measurement of heading is falsified.

Notably, for a given sampling time k+1, the calculation means estimate a linked heading disturbance by calculating $$\psi^{(d)}[k+1] = \alpha[k](\psi^{(d)}[k] + \hat{u}[k]) + (1-\alpha[k])\frac{\hat{u}[k]}{2} + v_{\psi^{(d)}}[k]$$

where $$\alpha[k] = 1 - \frac{\sigma_u[k]^2}{2a[k]^2}$$

and $v_{\psi^{(d)}}$ is a random Gaussian variable of variance $$a[k]^2(1-\alpha[k]^2)$$

k being the preceding sampling time, a[k] being a parameter which represents the a priori amplitude of the magnetic disturbance, $\hat{u}$ and $\sigma_u$ being two parameters calculated by the calculation means as an estimation of the expectation and the variance in the change in the disturbance.

Advantageously, the calculation means estimate the parameter a[k] as a linear function of the norm of the magnetic field gradient.

The parameter $\hat{u}[k]$ is for its part for example calculated by the calculation means as the difference between the magnetic headings determined directly from magnetometer outputs for the times k+1 and k, from which is subtracted the change in predicted heading ($\omega[k]dt$).

The parameter $\sigma_u$ may be estimated as a function of the velocity of displacement or the displacement between two successive sampling times.

The processing implements for example a Kalman filtering of which the state has at least as parameter the real heading and the magnetic heading disturbance ($\psi$, $\psi^{(d)}$).

The heading prediction may be determined as a function of measurements of one or more sensors of an inertial unit.

The change model is determined beforehand to take account of a spatial or temporal correlation of the changes in disturbances.

The invention further relates to a device for determining heading by magnetic sensors, comprising magnetometers and calculation means for the calculation of the heading from the magnetic field measured by said magnetometers, characterised in that the calculation means implement, for different successive sampling times, the aforesaid processing.

It also proposes a magneto-inertial navigation system comprising at least one such heading measurement device.

Such a system is advantageously used in urban environments or inside buildings.

The invention also relates to:

a computer programme product including code instructions for the execution of a method of the aforesaid type, when said programme is executed on a computer;

A storage means readable by a computer equipment on which a computer programme product includes code instructions for the execution of such a method.

DESCRIPTION OF THE FIGURES

Other characteristics and advantages of the invention will become clearer from the description that follows, which is purely illustrative and non-limiting, and which should be read with regard to the appended figures in which.

DESCRIPTION OF ONE OR MORE EMBODIMENTS

General Remarks—Measurement Device

Figure 1:
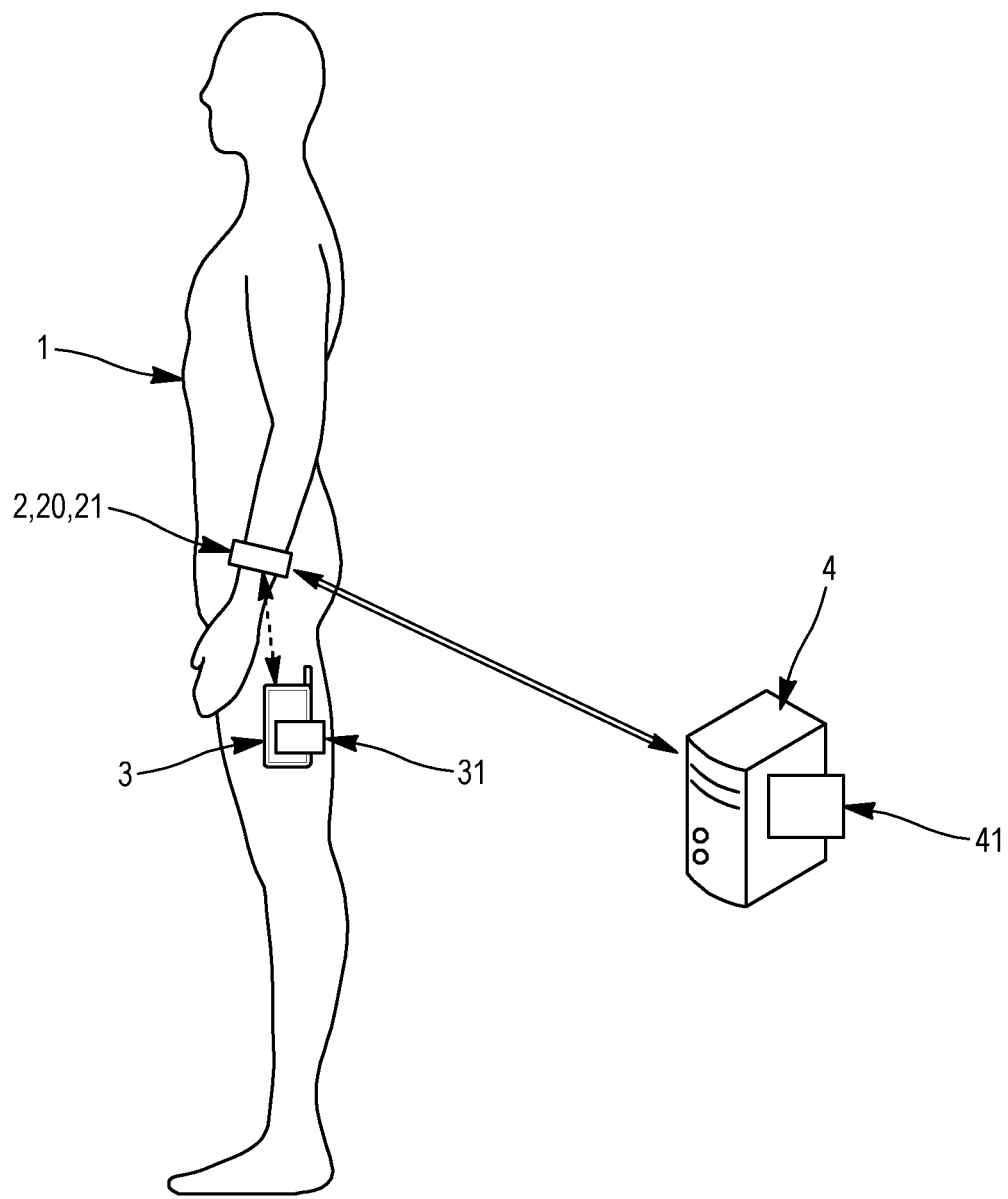
FIG. 1 is a diagram of equipment for the implementation of the method according to the invention.

With reference to FIG. 1, the proposed measurement device is for example used for the estimation of the movement of an object 1 moving in an ambient magnetic field (typically the Earth's magnetic field, which could be slightly altered by nearby metal objects), noted $\vec{B}$. As is known, the magnetic field is a three-dimensional vector field, that is to say associating a vector of three dimensions with each three-dimensional point in which the object is moveable.

This object 1 may be any moveable object of which knowledge of the position is desired, for example a wheeled vehicle, a drone, etc., but also a pedestrian.

The object 1 comprises in a case 2 (support) a plurality of magnetic measurement sensors 20, i.e. axial magnetometers 20. Axial magnetometer is taken to mean an element capable of measuring a component of said magnetic field, i.e. the projection of said magnetic field vector $\vec{B}$ at the level of said magnetometer 20 along its axis.

More precisely, the magnetometers 20 are integral with the case 2. They have a movement substantially identical to the case 2 and to the object 1 in the terrestrial reference frame.

Preferably, the reference frame of the object 1 is provided with an orthonormal cartesian point of reference in which the magnetometers 20 have a predetermined position in this point of reference.

Figure 2:
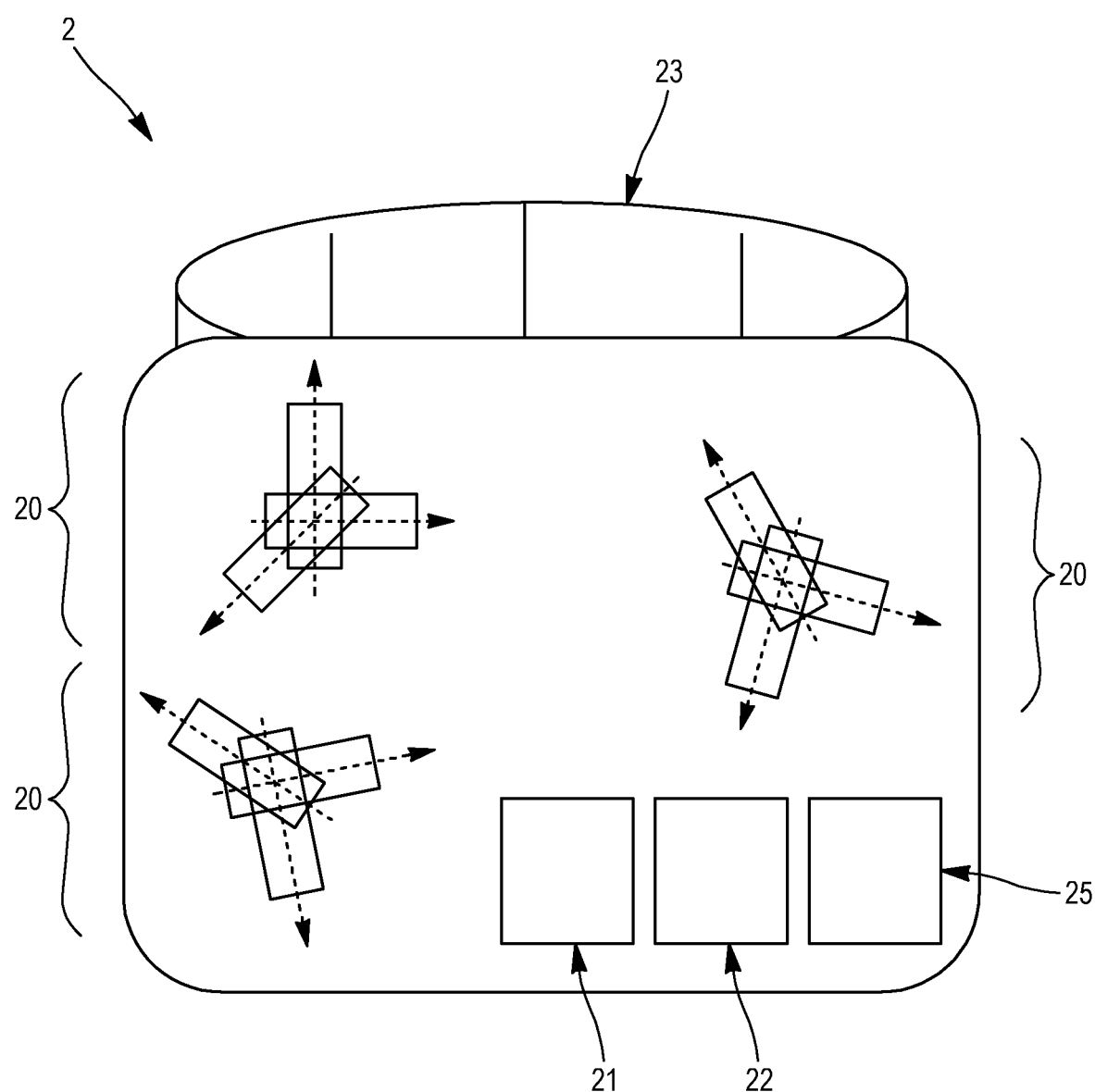
FIG. 2 represents in greater detail an example of case for the implementation of the method according to the invention.

In FIG. 2, the case 2 is fixed onto the object 1 (for example a limb of the pedestrian) by attachment means 23. These attachment means 23 consist for example of a bracelet, for example a self-gripping strap that grips the limb and enables an integral link.

Obviously, the invention is not limited to the estimation of the movement of a pedestrian, but it is particularly advantageous in such a use because it enables very reduced bulk, which is necessary for the case to be portable by a human in an ergonomic manner.

The case 2 may include calculation means 21 (typically a processor) for implementing directly in real time the processing operations of the present method, or instead the measurements may be transmitted via communication means 25 to an external device such as a mobile terminal (smartphone) 3, or even a remote server 4, or instead the measurements may be recorded in local data storage memory means 22 (a flash type memory for example) for a posteriori processing for example on the server 4.

The communication means 25 may implement a short range wireless communication, for example Bluetooth or Wi-Fi (in particular in an embodiment with a mobile terminal 3) or even be means for connecting to a mobile network (typically UMTS/LTE) for a long distance communication. It should be noted that the communication means 25 may be for example a wired connection (typically USB) for transferring data from the local data storage means 22 to those of a mobile terminal 3 or a server 4.

If it is a mobile terminal 3 (respectively a server 4) that hosts the "intelligence", it includes calculation means 31 (respectively 41) such as a processor for implementing the processing operations of the present method that are going to be described. When the calculation means used are those 21 of the case 2, it may further include communication means 25 for transmitting the estimated position. For example the position of the bearer may be sent to the mobile terminal 3 to display the position in a navigation software interface.

The data calculation means 21, 31, 41 respectively of the case 2, a smartphone 3 and a remote server 4 may indifferently and according to the applications carry out all or part of the steps of the method.

They each comprise to this end storage means in which are memorised all or part of sequences of code instructions for the execution of the method.

Prediction and Resetting

Figure 3:
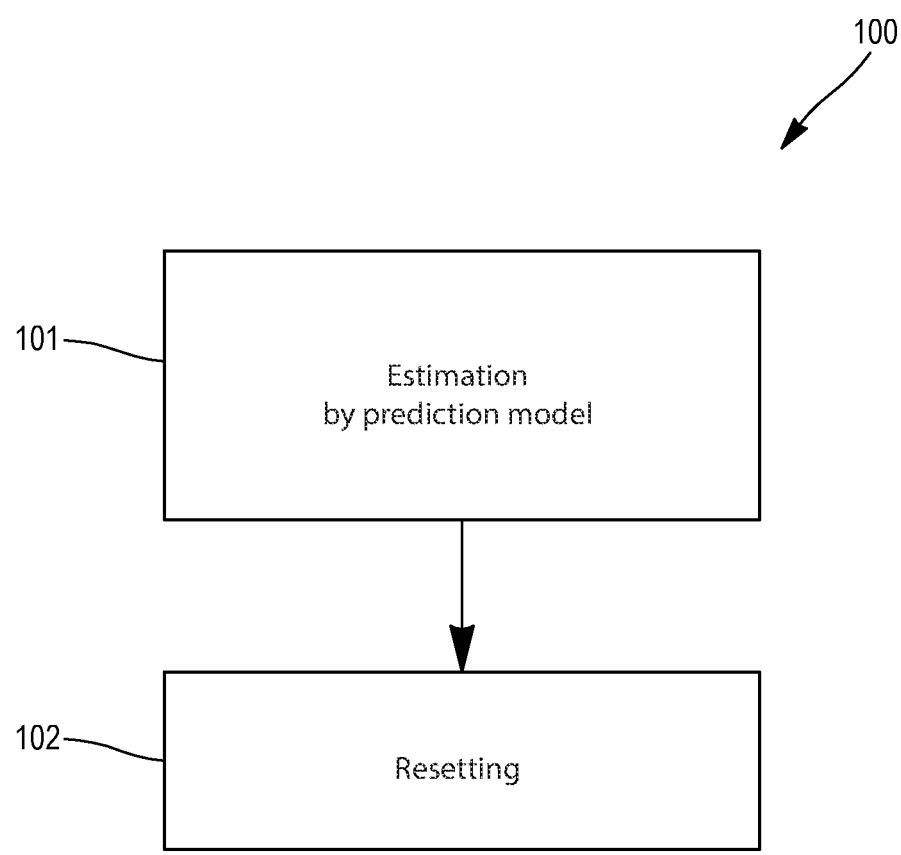
FIG. 3 illustrates the main steps of a method complying with an embodiment of the invention.

The calculation means implement (FIG. 3) a filtering 100 calculating on the one hand an estimation of the heading value by prediction (step 101) and on the other hand implementing a resetting as a function of an error estimation (step 102).

Notably, knowing the angular velocity ω given for example by a gyrometer, step 101 calculates the heading $\psi_{k+1}$ at a time k+1 as equal to $$\psi_{k+1} = \psi_k + \omega \cdot \Delta t$$

where $\psi_k$ is the heading at the preceding time k and where Δt is the duration separating these two sampling times.

The resetting 102 takes into account the measurements made by the magnetometers 20.

Hereafter, the measurement of the magnetic heading (derived from the measurements of the magnetometers) for a given time k is noted $z_\psi[k]$, with $$z_\psi[k] = \psi_k$$

Typically, the magnetic heading is given by $$z_\psi[k] = \operatorname{atan}\left(\frac{My[k]}{Mx[k]}\right)$$

where My and Mx are two horizontal components of the magnetic field in a terrestrial reference frame, these two components being calculated as a function of the attitude determined for the object 1 by an inertial unit thereof.

The calculation means calculate the reset heading $\psi_{k+1}^{reset}$ corresponding to time k+1 as equal to the sum of the estimated heading $\psi_{k+1}$ at this time and a resetting which is advantageously a function
- of a gain $K_k$ calculated or adjusted with respect to the preceding time k
- of an estimation of the error $\operatorname{Err}(\psi_{k+1}, z_\psi)$ between the predicted heading $\psi_{k+1}$ and the measurement $z_\psi$.

Thus, the calculation means use the magnetic heading derived from the measurement by the magnetometers to reset the state, and in particular the heading, by calculating $$\psi_{k+1}^{reset} = \psi_{k+1} + K_k \cdot \operatorname{Err}(\psi_{k+1}, z_\psi)$$

Typically, the error $\operatorname{Err}(\psi_{k+1}, z_\psi)$ may be a simple difference between the predicted heading, estimated at the time k+1 (before resetting), and the magnetic heading $z_\psi$ derived from the magnetometer measurements.

Other error functions are nevertheless possible, notably in the case of a non-linear filtering.

In particular, the resetting $K_k \cdot \operatorname{Err}(\psi_{k+1}, z_\psi)$, and more particularly the gain $K_k$, may advantageously depend on the magnetic field gradient measured by the magnetometers 20.

In this way, the resetting correction is all the greater when the magnetic field varies strongly and is thus liable to induce important errors on the heading measurement.

The reset heading value thereby obtained is stored by said calculation means 21, 31, 41 and/or used by said means for the remainder of the processing and for the calculations of magneto-inertial navigation information (linear velocity, angular velocity, position, heading, etc.).

Also, it may be transmitted by the calculation means to interface means, for example on the telephone to be displayed on the screen thereof.

Model of Change in Disturbances Linked to the Environment

An example of possible calculation of the resetting in which the measurement of magnetic heading $z_\psi$ is corrected by an estimation of the disturbance of the magnetic field linked to the environment is detailed hereafter.

The magnetic heading $z_\psi$ derived from the measurement by the magnetometers may in fact be considered as being broken down as follows:

$$z_\psi = \psi + \psi^{(d)} + v_{z_\psi}$$

where:
- ψ corresponds to the real heading that it is wished to determine,
- $v_{z_\psi}$ corresponds to a Gaussian measurement error and
- $\psi^{(d)}$ ("d" for disturbance) corresponds to a magnetic heading disturbance linked to the environment (typically, disturbances linked to metal infrastructures and to electric cables in urban environments or in buildings).

The magnetic heading disturbance linked to the environment is highly correlated spatially. The magnetic field linked to disturbances of the environment is in fact a continuous vector field and the magnetic fields at two given points A and B are all the closer when these two points A and B are neighbouring in space.

In an embodiment, the heading disturbance $\psi^{(d)}$ linked to the environment is estimated by the calculation means by means of a formulation taking into account the change correlations that may be expected for the magnetic field disturbances between two successive sampling times (temporal, spatial correlation or more complex).

This estimation is constructed to enable a Markovian model (which may be used in a recursive filter) for the change in $\psi_d$ and
- makes it possible to take into account a model of the change in the magnetic heading disturbance (temporal, spatial correlation or more complex),
- makes it possible to construct a filtering model for which the heading is observable (otherwise, any hope of constructing a heading estimator is lost).

In the proposed estimation, the amplitude of the resetting is estimated as a function of a model of the change in magnetic disturbances between two sampling times and an a priori estimation of the amplitude of the disturbances.

The Inventors have found (and mathematically verified) that in the case of a spatial correlation (case of disturbances in urban areas or indoors), a suitable estimation of the change in the disturbance $\psi^{(d)}$ between two sampling times separated by a time step is advantageously as follows:

$$\psi^{(d)}[k+1] = \alpha[k](\psi^{(d)}[k] + \hat{u}[k]) + (1 - \alpha[k])\frac{\hat{u}[k]}{2} + v_{\psi^{(d)}}[k]$$

where $$\alpha[k] = 1 - \frac{\sigma_u[k]^2}{2a[k]^2}$$

a[k] being a parameter which represents the a priori amplitude of the magnetic disturbance, û and $\sigma_u$ being the expectation and the variance in a random variable which is a model (in the form of a random Gaussian variable) of the variation in the magnetic heading disturbance between 2 sampling times, $v_{\psi^{(d)}}$ is an estimation taking into account the noise of the magnetometers.

This estimation is subtracted from $z_\psi$ for the error calculation, this being able to be directly calculated between $\psi_{k+1}$ and $(z_\psi - \psi^{(d)}[k+1])$, or confined to a Kalman type filter which has both $\psi^{(d)}$ and $\psi$ in its state.

Determination of the Parameter a[k]

The parameter a[k] represents the a priori amplitude of the magnetic heading disturbance. It characterises the heading and is for example calculated as a linear function of the norm of the magnetic field gradient.

For example, $$a[k] = a_0 + a_1 N[k]$$

with $$N[k] = \|\widehat{\nabla B}[k]\|$$

$a_0$ and $a_1$ being two parameters fixed beforehand before implementation of the filtering processing, $\hat{B}[k]$ as long as the magnetic field is at time k.

In this way, as indicated above, the resetting term $K_k \cdot \text{Err}(\psi_{k+1}, z_\psi)$ is a function of the magnetic field gradient measured by the magnetometers 20, which enables an efficient correction.

Other methods are possible to determine the parameter a[k].

Notably, a[k] may also be determined by comparison with a model of the Earth's magnetic field, for example by implementing the techniques such as proposed in the publication:

"Assessment of Indoor Magnetic Field Anomalies using Multiple Magnetometers Assessment of Indoor"—M. H. Afzal, V. Renaudin, G. Lachapelle—Proceedings of the 23rd International Technical Meeting of The Satellite Division of the Institute of Navigation (ION GNSS 2010) Sep. 21-24, 2010.

The solutions in which the parameter a[k] is a function of the magnetic field gradient enable however better corrections, and do not require models of the Earth's magnetic field.

Determination of the Parameter û

The parameter û[k] represents the most probable value for the change in the disturbance.

This parameter is for example calculated using gyrometers that are assumed correct in the short term. The most probable change in the disturbance is then given by the difference between the change in the magnetic heading measurement and the change in the gyrometric heading:

$$\hat{u}[k] = E[\psi^{(d)}[k+1] - \psi^{(d)}[k]]$$
$$= E\left[\underbrace{\psi^{(d)}[k+1] + \psi[k+1]}_{\text{magnetic heading measured at time } k+1} - \underbrace{(\psi^{(d)}[k] + \psi[k])}_{\text{magnetic heading measured at time } k} - \underbrace{(\psi[k+1] - \psi[k])}_{\text{change in heading}}\right]$$
$$= z_\psi[k+1] - z_\psi[k] - \omega[k]dt$$

where: E[·] is the mathematical expectation, ω[k] is the gyrometric rotation velocity and dt is the sampling pitch.

Thus, the parameter û[k] is calculated by the calculation means as the difference between the magnetic headings determined directly from the magnetometer outputs for the times k+1 and k, from which is subtracted the predicted rotation ω[k]dt.

Determination of the Parameter $\sigma_u$

The parameter $\sigma_u$ represents the image of the correlation between the disturbance at step k and that at step k+1.

It is possible to choose advantageously to index it on the velocity of displacement (or on the displacement between two successive sampling times, which is similar) in such a way as to take account of the spatial correlation of the magnetic disturbances.

One could for example take $$\sigma_u = c \cdot \|v\|$$

where c is an adjustment coefficient.

The invention claimed is:

1. A method for determining a heading of a moving object provided with magnetometers, said moving object moving in a magnetic field having magnetic disturbances, said method comprising:
   determining magnetometer measurements by measuring with the magnetometers said magnetic field at a current sampling time,
   implementing a recursive processing for the current sampling time using a processor in which said processor calculates:
   a measured heading from the magnetometer measurements at the current sampling time,
   an estimation of a predicted heading as a function of a heading determined at a preceding sampling time, and
   a correction term for correcting the predicted heading estimated as a function of the measured heading determined from the magnetometer measurements,
   wherein the processor estimates the correction term based on a model of magnetic disturbances change between two sampling times
   and an a priori estimation of an amplitude of the magnetic disturbances,
   wherein the model of magnetic disturbances change is determined beforehand to take into account a spatial correlation of changes in magnetic disturbances, and
   wherein the processor corrects the predicted heading with the correction term and determines the heading of the moving object from the predicted heading corrected by the correction term, and provides the heading of the moving object.

2. The method according to claim 1, in which for a given sampling time k+1, the processor estimates the heading disturbance linked to the environment by calculating $$\alpha[k](\psi^{(d)}[k] + \hat{u}[k]) + (1 - \alpha[k])\frac{\hat{u}[k]}{2} + v_{\psi^{(d)}}[k]$$

where $$\alpha[k] = 1 - \frac{\sigma_u[k]^2}{2a[k]^2}$$

and $v_{\psi^{(d)}}$ is a random Gaussian variable of variance $a[k]^2$ $(1-\alpha[k]^2)$, k being the preceding sampling time, a[k] being a parameter which represents the a priori amplitude of the magnetic disturbance, û and $\sigma_u$ being two parameters calculated by the processor as an estimation of the expectation and the variance in the change in disturbance.

3. The method according to claim 1, in which said correction term is a function of the measured magnetic field gradient.

4. The method according to claim 2, in which said correction term is a function of the measured magnetic field gradient and the processor estimates the parameter a [k] as a linear function of the norm of the magnetic field gradient.

5. The method according to claim 2, in which the parameter û[k] is calculated by the processor as the difference between the magnetic headings determined directly from the magnetometer outputs for the times k+1 and k, from which is subtracted the predicted change in heading (ω[k]dt).

6. The method according to claim 2, in which the parameter $\sigma_u$ is estimated as a function of the velocity of displacement or the displacement between two successive sampling times.

7. The method according to claim 2, in which the processing implements a Kalman filtering of which the state has at least as parameter the real heading and the magnetic heading disturbance ($\psi$, $\psi^{(d)}$).

8. The method according to claim 1, in which the heading prediction is determined as a function of measurements of one or more sensors of an inertial unit.

9. The method according to claim 1, in which the change model is determined beforehand in order to take account of a temporal correlation of the changes in disturbances.

10. A device for determining heading of a moving object provided with magnetometers, comprising a processor for the calculation of the heading of the moving object from the magnetic field measured by said magnetometers, wherein the processor implements, for different successive sampling times, the processing of the method according to claim 1.

11. Magneto-inertial navigation system comprising at least one device for determining heading according to claim 10.

12. Use of a system according to claim 11 in applications in urban environment or inside buildings.

13. A non-transitory computer program product including code instructions for the execution of a magnetic field measurement method according to claim 1, when said program is executed on a computer.

14. A non-transitory storage means readable by a computer equipment on which a computer program is stored including code instructions for the execution of a magnetic field measurement method according to claim 1.

* * * * *